May 31, 1932.   P. P. PIPES   1,860,786

RAIL BOND

Original Filed May 25, 1927

Witness:
H. J. Stromberger

Inventor
PLINY P. PIPES
By
Attorney

Patented May 31, 1932

1,860,786

UNITED STATES PATENT OFFICE

PLINY P. PIPES, OF MANSFIELD, OHIO, ASSIGNOR TO THE OHIO BRASS COMPANY, OF MANSFIELD, OHIO, A CORPORATION OF NEW JERSEY

RAIL BOND

Application filed May 25, 1927, Serial No. 193,978. Renewed October 11, 1929.

My invention relates to connectors for electrically uniting the adjacent ends of conductors and particularly that class of connectors known as rail bonds.

The object of my invention is to provide a simple, efficient and inexpensive bond, and which can be applied to the rail by means of the carbon or metallic arc or by the oxyacetylene flame.

Another object of my invention is to provide a bond in which the parts of the bond and the rail are each united to the other through the medium of a welding metal which is integrally united to each of the parts by a welded or molecular union.

Another object of my invention is to provide a bond in which the parts when united to a rail rest in substantially a horizontal plane.

My invention resides in the new and novel construction, combination and relation of the various parts hereinafter described and shown in the accompanying drawings.

Figure 1:
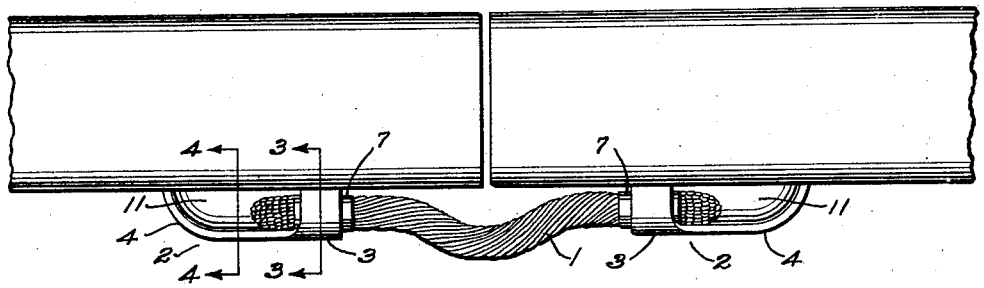
Fig. 1 shows a top view of the bond as positioned upon the side of a rail head and ready for welding by means of the electric arc.

In the preferred embodiment of my invention I employ a flexible body 1 which may be composed of a plurality of wires or laminations and made preferably of copper although other metals may be used if desired. The body member is given a U-shaped bend to give the bond greater flexibility for the parts to move in a longitudinal direction when applied to a rail and which movement is due to contraction and expansion of the rails.

To each end of the body is secured a terminal member 2 formed up preferably of sheet steel or iron, although copper or copper base alloy may be used, such as phosphorus copper.

The terminal comprises a sleeve portion 3 and a projecting portion 4. The sleeve portion has two flat surfaces 5 and 6. These are made preferably flat for presentation to the surface of the rail, depending upon whether the bond is to be applied by the electric arc or oxy-acetylene flame, as later described. As stated, the terminal is preferably formed up out of sheet metal, which is a simple and inexpensive operation and permits the use of material more suited to the requirements than where the terminal is cast, and the sleeve portion 3 can be left somewhat open for the convenient insertion of the body 1 and the sleeve 7, preferably formed up out of thin sheet copper. The sleeve portion 3 is compressed upon the sleeve 7 and body 1 and the fact that the sleeve 3 is not continuous, but is provided with the joint 8, permits the sleeve 3 to engage the parts 1 and 7 more securely and neatly than if the sleeve 3 were continuous, which would probably require a crimping or folding of the metal in the sleeve 3 to bring it into proper relation with the parts.

Figure 4:
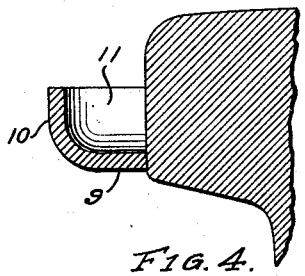
Fig. 4 is a section of the bond on the line 4—4 and shows the relation of the bond terminal at this point to the rail head.
Figure 5:
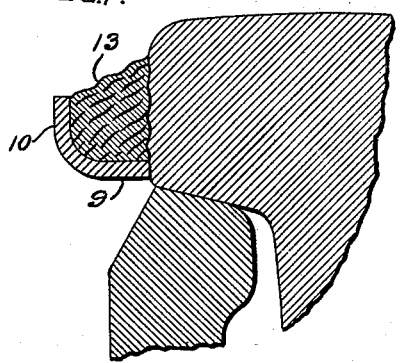
Fig. 5 shows a section of the bond terminal as welded to a rail head by means of the electric arc.
Figure 6:
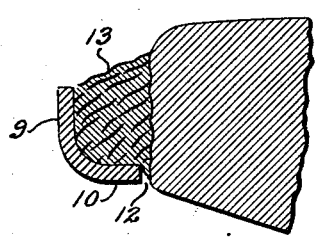
Fig. 6 is a section similar to Fig. 5, but in which another face of the bond terminal has been applied to the rail as hereinafter described and the bond terminal secured to the rail by means of the oxy-acetylene flame.

The projecting portion 4 I might describe as approaching a quarter section of a projectile, but the same does not conform to a plane of revolution, although it may, for the reason that I prefer to make the bottom portion 9 somewhat flat and a little longer than the side portion 10. As stated before, Fig. 4 shows the bond terminal as applied to the rail for arc welding and the length of the bottom 9 as compared with the side 10 gives a more shallow and wider space between the terminal and rail for the application of the arc electrode, but when the other face of the terminal is applied to the rail, the bottom 9, as shown in Fig. 6, becomes the side 10 and the side 10 becomes the bottom 9, and in tis position the bond can be applied by the oxy-acetylene flame. Of course, it is evident that the sides 9 and 10 can be made equal if desired or the projecting portion 4 could conform with a plane of revolution in which the inner and outer edges of the projecting portion 4, shown in Figs. 4 and 6, would conform to radii having a common center.

The terminal 2 when positioned against the rail forms a receptacle 11 therewith, and the end of the body member 1 projecting within the receptacle 11 forms, together with the inner face of the sleeve 3, a wall or one side of the receptacle.

It will be noted that the terminal varies in height, as indicated by the angle $a$, when in one position on the rail, and this is for the purpose of reducing the depth of the recess at the extreme end of the terminal so as to economize in the amount of metal which is necessary to attach the terminal to the rail, as attaching metal is usually of copper or a copper base alloy, containing a fluxed material and which is relatively expensive.

The projection of the body member 1 within the receptacle permits the arc or oxy-acetylene flame to be played upon the end of the body 1 more conveniently and thereby insure proper union of the welding metal therewith.

Figure 2:
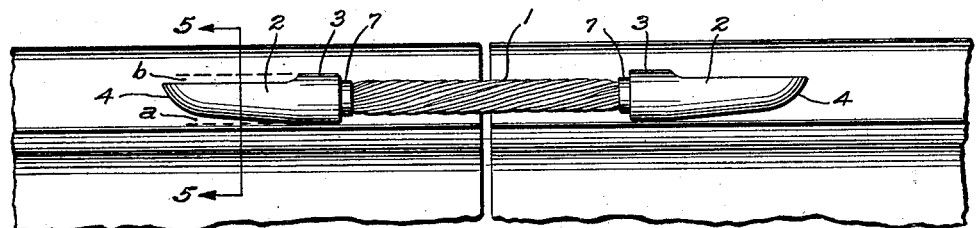
Fig. 2 shows a side view of the bond as positioned upon the side surface of the rail head.
Figure 7:
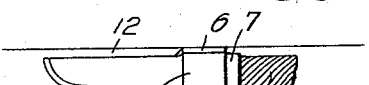
Fig. 7 is a top plan view of one end of the rail bond applied to the rail in the position illustrated in Fig. 6.
Figure 3:
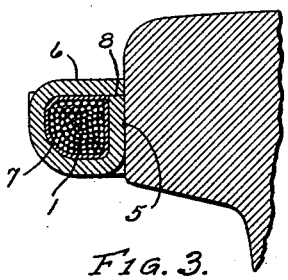
Fig. 3 is a section of a bond and on the line 3—3 and shows the relation of the bond terminal at this point to the rail head.

It will be noted in Fig. 2 that the upper edge of the terminal is lower than the upper edge of the sleeve 3 as indicated at $b$, and this difference permits a space 12 between the terminal and the rail head when the bond is applied in the other position and as shown in Fig. 6. This space is of considerable importance when the bond is applied by the oxy-acetylene flame, but is a detriment when applied by the electric arc, therefore, the bond being applicable to the rail in the two positions described is suitable in one position or the other for either the oxy-acetylene flame or the electric arc. The function of the space 12 is to prevent the rebound of the gas flame when it is directed into the corner between the terminal and the rail. I find that if I attempt to apply the terminal as shown in Fig. 4 by the gas flame, that the closed corner between the terminal and the rail appears to form a pocket which causes the flame to be reflected and which does not reach the extreme corner, and, therefore, the parts are not brought up to a temperature which will permit the welding metal to properly unite with the parts in the corner, but with the space 12 present, the flame is not reflected and shoots to some extent through the opening 12 thereby bringing the rail and the terminal at their adjacent points up to a proper temperature, and permitting the welding metal to thoroughly unite with the parts in the corner. The sleeve 7 absorbs vibration between the strands of the body 1 and the terminal, and also protects the strands, which are usually of copper, from the edge of the sleeve 3 and thereby prevents mechanical injury to the strands.

I prefer to have the terminal 2 securely united to the body 1 and sleeve 7 so that all relative movement therebetween is prevented. This I consider quite important for the reason that a welded union between the copper of the body and the attaching metal is liable to not be as strong as the unwelded metal, but if the terminal 2 is immovably and securely united to the body 1, then when the welding metal is applied to the receptacle 11 and united to the inner surface of the terminal and to the surface of the rail, these parts will be securely fixed against relative movement and will prevent any relative movement between the body member and the welding metal 13, and, therefore, the joint between the body metal and the welding metal will be maintained indefinitely, which might not be the case with the welding metal united to the body 1 only.

Bonds have been produced in which the body member enters the terminal midway between the ends or projects at right angles to the terminal, but there are conditions under which bonds of this character cannot be used, and it is necessary that the entire bond shall rest above the surface of the fishplate, and I have, therefore, provided a bond of this character when applied by the electric arc, but when the bond is positioned for application by the oxy-acetylene flame, the bend will be directed downward, but if this is found to be inconvenient, it is a very simple matter for the workmen to straighten the body out and give it the necessary bend at right angles to that shown in Fig. 1, thereby bringing the entire bond when applied by the oxy-acetylene flame above the fishplate and in a substantially common horizontal plane.

It might be said that the axis of the terminals are longitudinal and the axis of the body portion is also longitudinal and the bond is substantially a straight line bond, also the axis of the terminal and that of the body may not exactly coincide.

There are, of course, modifications to the bond as disclosed, which will be evident to those skilled in the art, and, therefore, I wish to be limited only by my claims.

I claim:

1. A rail bond terminal comprising a sleeve portion having a recess therein to receive and grip a conductor, a projecting portion forming with a rail a receptacle having concave shaped bottom and side walls, said receptacle being closed at the end remote from the sleeve and having two open side faces disposed in intersecting planes, the terminal being applicable to a rail surface in two positions, in each of which, one or the other of said open side faces, lies adjacent the rail and in one of which a space exists between the rail surface and the edge of the projecting portion.

2. A rail bond terminal comprising a sleeve portion having a recess therein to receive and grip a conductor, a projecting portion, the sleeve and projecting portion being applicable to the rail in two different relative positions and forming with the rail in each position a receptacle which is closed at the bottom adjacent the rail in one position and which is open at the bottom adjacent the rail in the other position, said terminal having two contact portions, each of which is extended to bear at a plurality of points on the surface of said rail, not in a straight line, to locate said terminal in either of its two positions.

3. A bond terminal comprising a portion to grip a conductor, an elongated portion projecting from the first said portion and having side and bottom walls to form with the vertical surface only of a rail a receptacle to catch, support and retain molten attaching metal, said receptacle having open sides opposite said side and bottom walls respectively, the outer edge of one of said walls being offset back from the outermost face of said gripping portion to hold said edge away from said rail surface for one position of said terminal, the receptacle formed by the said walls decreasing in depth in a direction away from the said gripping portion to reduce the amount of attaching metal used.

4. A rail bond terminal having a portion to grip a conductor and having two flat sides each applicable to a rail surface, an elongated part projecting from the said portion and forming a receptacle to catch, support and retain molten metal, the projecting part provided with two edges, one of which is substantially flush with one side of the said gripping portion adjacent the portion and the other edge depressed relative to the other face of the said gripping portion, the projecting part forming with the rail surface a receptacle.

In testimony whereof I affix my signature.
PLINY P. PIPES.